United States Patent
Phuyal et al.

(10) Patent No.: US 11,564,214 B2
(45) Date of Patent: Jan. 24, 2023

(54) PRE-CONFIGURED UPLINK (UL) RESOURCE (PUR) START TIME AND OFFSET

(71) Applicant: QUALCOMM Incorporated, San Diego, CA (US)

(72) Inventors: Umesh Phuyal, San Diego, CA (US); Alberto Rico Alvarino, San Diego, CA (US); Bharat Shrestha, San Diego, CA (US); Mungal Singh Dhanda, Slough (GB); Ayan Sengupta, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 58 days.

(21) Appl. No.: 17/229,635

(22) Filed: Apr. 13, 2021

(65) Prior Publication Data
US 2021/0321391 A1   Oct. 14, 2021

Related U.S. Application Data

(60) Provisional application No. 63/009,909, filed on Apr. 14, 2020.

(51) Int. Cl.
*H04W 4/00* (2018.01)
*H04W 72/04* (2009.01)

(52) U.S. Cl.
CPC .................. *H04W 72/0413* (2013.01)

(58) Field of Classification Search
CPC ... H04L 5/0053; H04L 5/0055; H04L 5/0057; H04W 72/0413; H04W 72/0446
See application file for complete search history.

(56) References Cited

U.S. PATENT DOCUMENTS

| 2021/0105828 A1* | 4/2021 | Agiwal ................ H04B 17/327 |
| 2021/0385835 A1* | 12/2021 | Medina Acosta ..... H04L 5/0044 |
| 2022/0116881 A1* | 4/2022 | Shin ........................ H04L 1/189 |

FOREIGN PATENT DOCUMENTS

| EP | 3846570 A1 | 7/2021 |
| WO | 2020067821 A1 | 4/2020 |

OTHER PUBLICATIONS

International Search Report and Written Opinion—PCT/US2021/027361—ISA/EPO—dated Aug. 25, 2021.
Rapporteur, D., (Blackberry): "RAN2 Agreements for Rel-16 Additional Enhancements for NB-IoT and MTC", 3GPP Draft, 3GPP TSG-RAN WG2 Meeting #109_e, R2-2001886, 3rd Generation Partnership Project (3GPP), Mobile Competence Centre, 650, Route Des Lucioles, F-06921 Sophia-Antipolis Cedex, France, vol. RAN WG2, No. Feb. 24, 2020-Mar. 6, 2020, Mar. 15, 2020, XP051867032, 43 Pages, 2.4 Transmission in Preconfigured Resources 1.1 Coexistence with NR, Paragraph [02.4].

* cited by examiner

*Primary Examiner* — Bo Hui A Zhu
(74) *Attorney, Agent, or Firm* — Qualcomm Incorporated/Seyfarth Shaw LLP

(57) ABSTRACT

A method for wireless communication is presented. The method includes receiving pre-configured uplink resource (PUR) configuration information including one or more least significant bits (LSBs) of a hyper system frame number (H-SFN). The method also includes determining a PUR start time based on the H-SFN identified by the one or more LSBs. The method further includes transmitting data to a base station on a PUR identified in the PUR configuration information at the PUR start time.

30 Claims, 6 Drawing Sheets

PRE-CONFIGURED UPLINK (UL) RESOURCE (PUR) START TIME AND OFFSET

CROSS-REFERENCE TO RELATED APPLICATION

The present application claims the benefit of U.S. Provisional Patent Application No. 63/009,909, filed on Apr. 14, 2020, and titled "PRE-CONFIGURED UPLINK (UL) RESOURCE (PUR) START TIME AND OFFSET," the disclosure of which is expressly incorporated by reference in its entirety.

FIELD OF THE DISCLOSURE

Aspects of the present disclosure generally relate to wireless communications, and more particularly to techniques and apparatuses for pre-configured uplink (UL) resource (PUR) start time and offset.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP).

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunications standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

SUMMARY

In one aspect of the present disclosure, a method for wireless communication by a user equipment (UE) is disclosed. The method includes receiving PUR configuration information comprising one or more least significant bits (LSBs) of a hyper system frame number (H-SFN). The method also includes determining a PUR start time based on the H-SFN identified by the one or more LSBs. The method further includes transmitting, to a base station, a data message on a PUR indicated in the PUR configuration information at the PUR start time.

Another aspect of the present disclosure is directed to an apparatus for wireless communication by a UE. The apparatus includes means for receiving PUR configuration information comprising one or more LSBs of an H-SFN. The apparatus also includes means for determining a PUR start time based on the H-SFN identified by the one or more LSBs. The apparatus further includes means for transmitting, to a base station, a data message on a PUR indicated in the PUR configuration information at the PUR start time.

In another aspect of the present disclosure, a non-transitory computer-readable medium with non-transitory program code recorded thereon for wireless communication by a UE is disclosed. The program code is for wireless communication. The program code is executed by a processor and includes program code to receive PUR configuration information comprising one or more LSBs of an H-SFN. The program code also includes program code to determine a PUR start time based on the H-SFN identified by the one or more LSBs. The program code further includes program code to transmit, to a base station, a data message on a PUR indicated in the PUR configuration information at the PUR start time.

Another aspect of the present disclosure is directed to an apparatus for wireless communications at a UE. The apparatus includes a processor, a memory coupled with the processor, and instructions stored in the memory and operable, when executed by the processor, to cause the apparatus to receive PUR configuration information comprising one or more LSBs of an H-SFN. Execution of the instructions also cause the apparatus to determine a PUR start time based on the H-SFN identified by the one or more LSBs. Execution of the instructions further cause the apparatus to transmit, to a base station, a data message on a PUR indicated in the PUR configuration information at the PUR start time.

In one aspect of the present disclosure, a method wireless communication by a UE is disclosed. The method includes determining one or more LSBs of an H-SFN where a UE received a connection release message comprising PUR configuration information. The method also includes transmitting a signal including the one or more LSBs to a base station. The signal may be included in an RLC (radio link control) message, or a RRC message, or a similar type of message.

Another aspect of the present disclosure is directed to an apparatus for wireless communication by a UE. The apparatus includes means for determining one or more LSBs of an H-SFN where a UE received a connection release message comprising PUR configuration information. The apparatus also includes means for transmitting a signal including the one or more LSBs to a base station. The signal may be included in an RLC (radio link control) message, or a RRC message, or a similar type of message.

In another aspect of the present disclosure, a non-transitory computer-readable medium with non-transitory program code recorded thereon for wireless communication by a UE is disclosed. The program code is for wireless communication. The program code is executed by a processor and includes program code to determine one or more LSBs of an H-SFN where a UE received a connection release message comprising PUR configuration information. The program code also includes program code to transmit a signal including the one or more LSBs to a base station. The signal may be included in an RLC (radio link control) message, or a RRC message, or a similar type of message.

Another aspect of the present disclosure is directed to an apparatus for wireless communications at a UE. The apparatus includes a processor, a memory coupled with the processor, and instructions stored in the memory and operable, when executed by the processor, to cause the apparatus to determine one or more LSBs of an H-SFN where a UE received a connection release message comprising PUR configuration information. Execution of the instructions also cause the apparatus to transmit a signal including the one or more LSBs to a base station. The signal may be included in an RLC (radio link control) message, or a RRC message, or a similar type of message.

In one aspect of the present disclosure, a method for wireless communication by a UE is disclosed. The method includes decoding a downlink (DL) transmission. The method also includes determining whether the DL transmission is a retransmission. The method further includes using an H-SFN of the DL transmission as a reference H-SFN for determining a PUR start time when the DL transmission is the retransmission. The method further includes transmitting, to a base station, data on a PUR at the PUR start time.

Another aspect of the present disclosure is directed to an apparatus for wireless communication by a UE. The apparatus includes means for decoding a DL transmission. The apparatus also includes means for determining whether the DL transmission is a retransmission. The apparatus further includes means for using an H-SFN of the DL transmission as a reference H-SFN for determining a PUR start time when the DL transmission is the retransmission. The apparatus further includes means for transmitting, to a base station, data on a PUR at the PUR start time.

In another aspect of the present disclosure, a non-transitory computer-readable medium with non-transitory program code recorded thereon for wireless communication by a UE is disclosed. The program code is for wireless communication. The program code is executed by a processor and includes program code to decode a DL transmission. The program code also includes program code to determine whether the DL transmission is a retransmission. The program code further includes program code to use an H-SFN of the DL transmission as a reference H-SFN for determining a PUR start time when the DL transmission is the retransmission. The program code still further includes program code to transmit, to a base station, data on a PUR at the PUR start time.

Another aspect of the present disclosure is directed to an apparatus for wireless communications at a UE. The apparatus includes a processor, a memory coupled with the processor, and instructions stored in the memory and operable, when executed by the processor, to cause the apparatus to decode a DL transmission. Execution of the instructions also causes the apparatus to determine whether the DL transmission is a retransmission. Execution of the instructions further causes the apparatus to use an H-SFN of the DL transmission as a reference H-SFN for determining a PUR start time when the DL transmission is the retransmission. Execution of the instructions still further causes the apparatus to transmit, to a base station, data on a PUR at the PUR start time.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description, may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Figure 1:
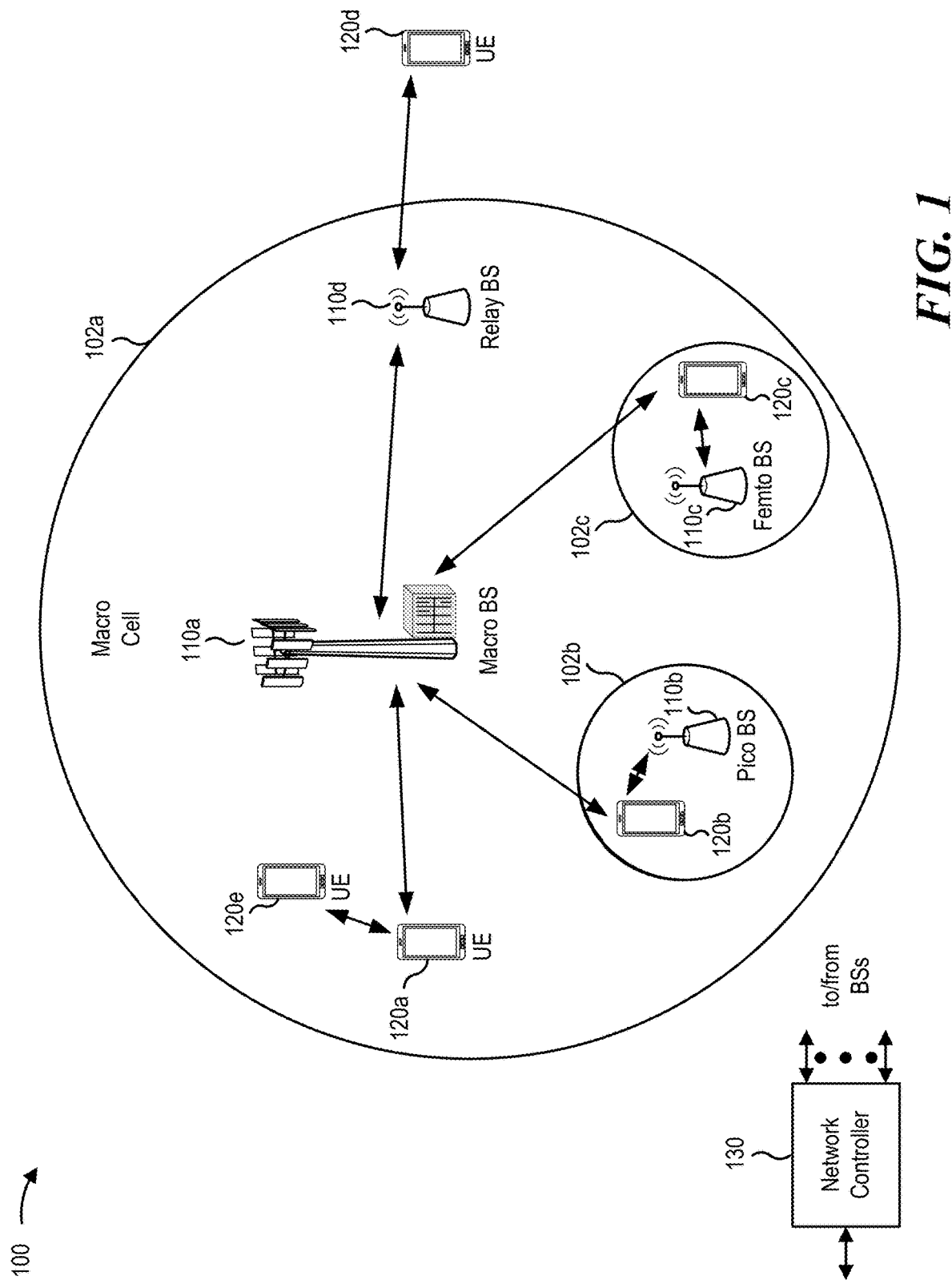
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

In some examples, a user equipment (UE) may request an offset for a start time for a data transmission on a preconfigured uplink resource (PUR). In some such examples, a PUR configuration request transmitted by the UE may include a time offset request. Additionally, a PUR configuration transmitted by a base station may include a time offset. In the present disclosure, the PUR configuration may refer to an initial PUR configuration or a PUR reconfiguration. In some example, the PUR configuration may be transmitted by the base station regardless of whether the UE transmitted the PUR configuration request. The maximum PUR time offset range may be the same as the maximum PUR periodicity. Future recurring PUR occasions are based on the first PUR occasion and PUR periodicity. In one configuration, the PUR configuration request may be transmitted in a PURConfigurationRequest message. A requestedTimeOffset field may request the offset. The base station may transmit the PUR start time in a pur-StartTime field of a PUR-Config information element. Additionally, the base station may configure and/or reconfigure the PUR with or without the UE request. The PUR configuration and/or reconfiguration may be provided in a radio resource control (RRC) connection release message. That is, a PUR-Config information element may be included in the RRCConnectionRelease message.

The network may be unaware of when the UE successfully receives the RRC connection release message. The release message may be successfully received via potential repetitions of an initial transmission, as well as one or more potential retransmissions, where the one or more retransmissions may also consist of repetitions. After the release message is successfully received by the UE, the UE enters an idle mode without sending a confirmation RRC message to the network. In some examples, the UE may send the confirmation via a one or both of physical layer acknowledgment (PHY ACK) or RLC poll bit, if configured.

Based on current medium access control (MAC) specifications, it is possible to have a misalignment. For example, the UE may receive a downlink message in a first physical downlink shared channel (PDSCH). In this example, the base station may miss the ACK and retransmit the downlink message. The UE may skip decoding the second downlink message, still the UE may send an ACK corresponding to the first downlink message. The base station may wrongly assume the UE only received the second downlink message. Depending on when the downlink message is received by the UE, the understanding of PUR start time (e.g., first PUR occasion) may be misaligned. An unambiguous reference time is desirable to determine the first PUR occasion.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB," "base station," "NR BS," "gNB," "TRP," "AP," "node B," "5G NB," and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in the wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. The network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
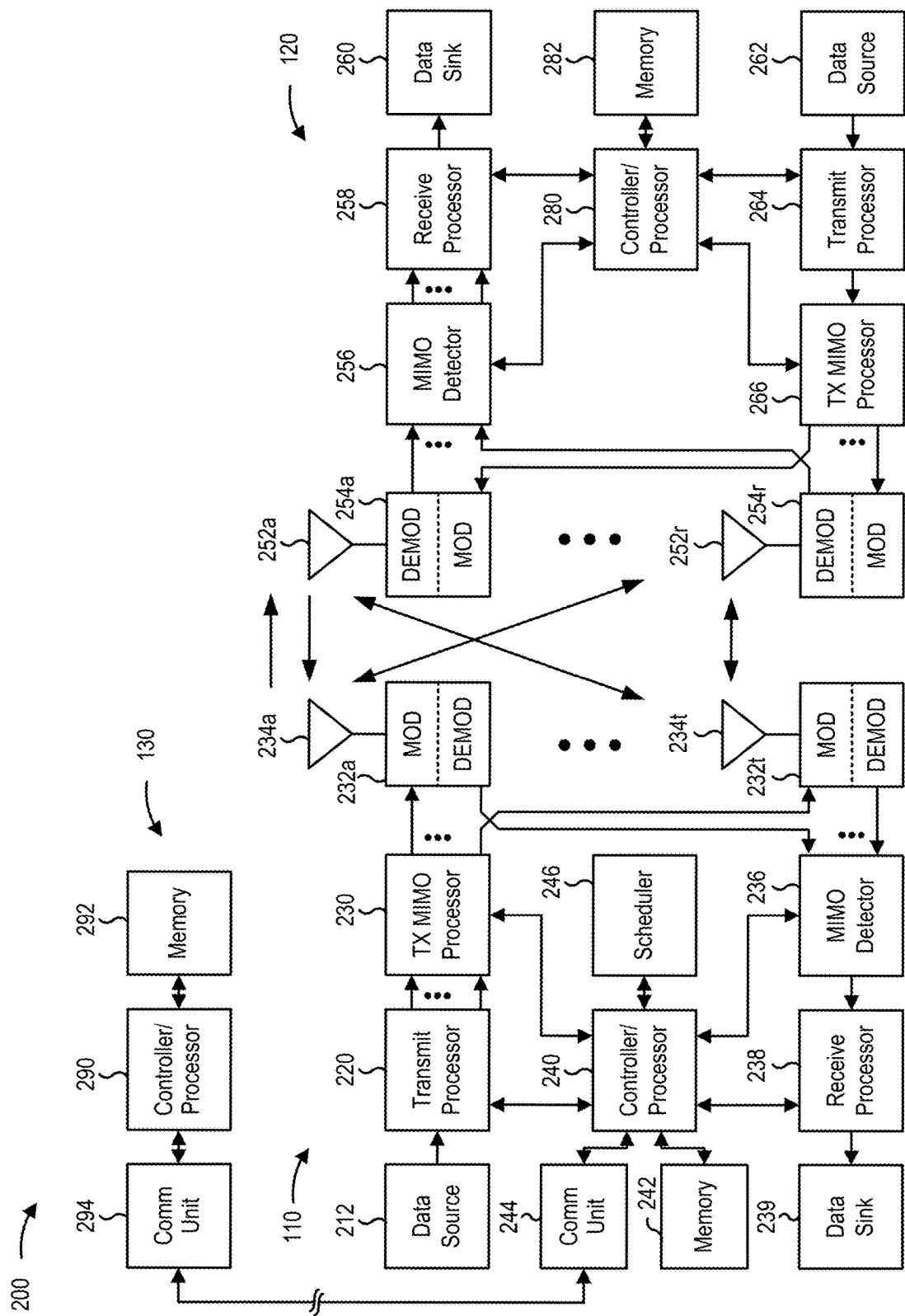
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (e.g., for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the network controller 130 via the communications unit 244. The network controller 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with machine learning for non-linearities, as described in more detail elsewhere. For example, the controller/processor 240 of the base station 110, the controller/processor 280 of the UE 120, and/or any other component(s) of FIG. 2 may perform or direct operations of, for example, the processes of FIGS. 6-8 and/or other processes as described. Memories 242 and 282 may store data and program codes for the base station 110 and UE 120, respectively. A scheduler 246 may schedule UEs for data transmission on the downlink and/or uplink.

In some aspects, the UE 120 may include means for receiving PUR configuration information comprising one or more LSBs of an H-SFN, means for determining a PUR start time based on the H-SFN identified by the one or more LSBs; and means for transmitting, to a base station, a data message on a PUR indicated in the PUR configuration information at the PUR start time.

In some aspects, the UE 120 may include means for receiving a downlink message comprising pre-configured uplink (UL) resource (PUR) configuration information; means for determining at least one least significant bit (LSB) of a hyper system frame number (H-SFN) corresponding to the received downlink message; and means for transmitting a signal including the one or more LSBs to a base station. The signal may include an RLC (radio link control) message, or a RRC message, or a similar type of message.

In some aspects, the UE 120 may include means for decoding a downlink (DL) transmission, means for determining whether the DL transmission is a retransmission, means for using an H-SFN of the DL transmission as a reference H-SFN for determining a PUR start time when the DL transmission is the retransmission; and means for transmitting, to a base station, a data message on a PUR indicated in the PUR configuration information at the PUR start time.

As indicated above, FIG. 2 is provided merely as an example. Other examples may differ from what is described with regard to FIG. 2.

Legacy uplink (UL) data transmissions (up to release 14 (Rel-14)) employ a four-step UL random access procedure, allowing a data transmission in a message five (Msg 5) uplink transmission. In at least release 15 (Rel-15), early data transmission (EDT) is specified to support a two-step uplink access procedure, such that data may be transmitted in a message three (Msg 3) uplink transmission. Data transmissions in a message one (Msg 1) uplink transmission, referred to as a pre-configured uplink resource (PUR), are specified in at least release 16 (Rel-16). In such examples, a UE in a radio resource control idle (RRC IDLE) mode may have a valid timing advance (TA) and may use the PUR for an uplink data transmission. In some such examples, the timing advance may be specified for a stationary UE. The PUR may be an example of a grant-free approach to uplink data transmissions and may improve uplink transmission efficiency and also reduce power consumption. For example, the PUR may improve transmission efficiency and reduce power consumption for enhanced machine-type communication/narrow band-Internet-of-Things (eMTC/NB-IoT) devices.

Figure 3:
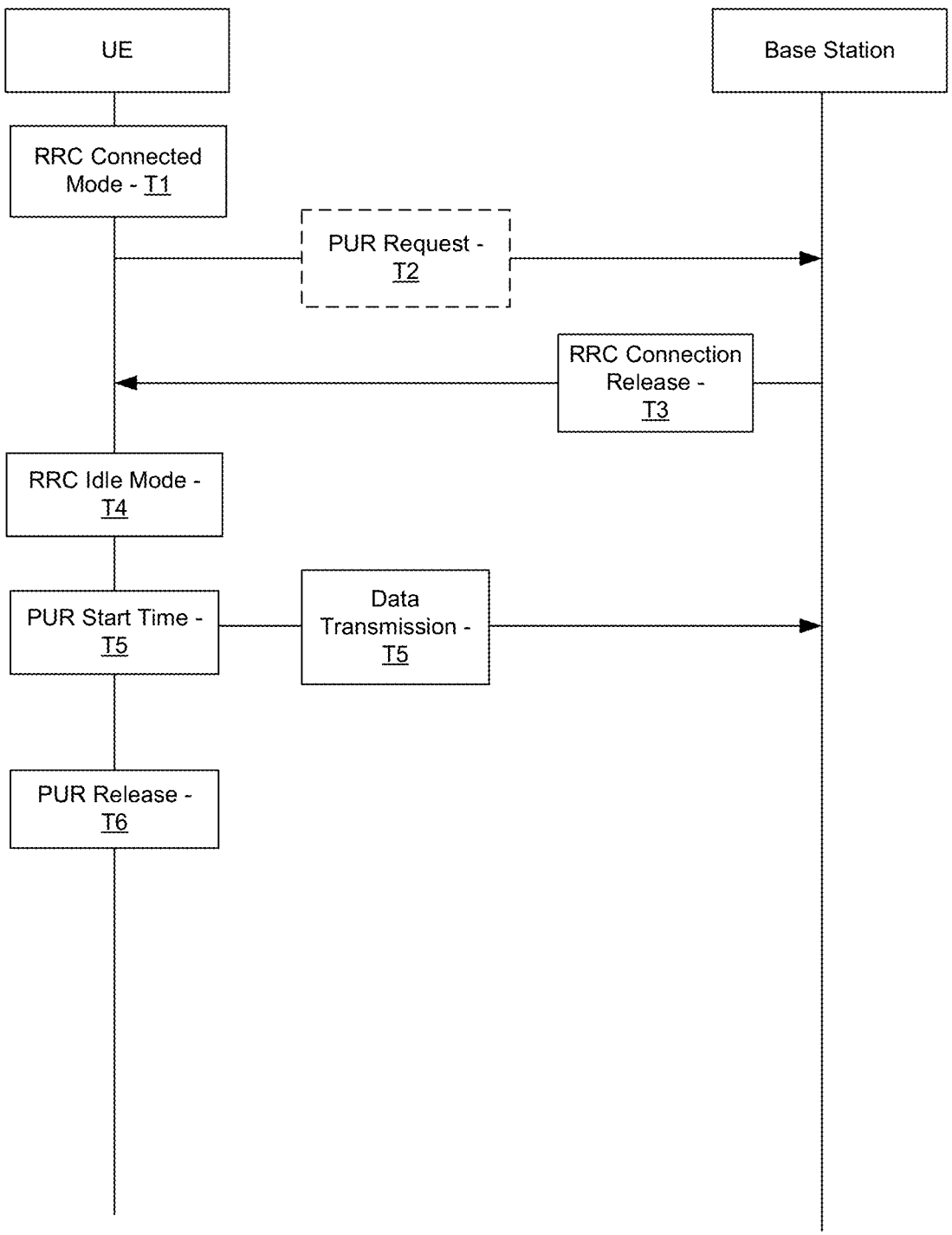
FIG. 3 is a diagram for a PUR call flow, in accordance with various aspects of the present disclosure.

FIG. 3 illustrates an example of a PUR call flow 300, according to aspects of the present disclosure. As shown in FIG. 3, at time T1, a UE is in a radio resource control (RRC) connected mode. While in the connected mode, at time T2, the UE may request pre-configured uplink resource (PUR) for an uplink transmission. In some examples, the resource request may include a PUR offset request indicating a requested offset for a PUR start time. As described, the PUR request at time T2 may be optional.

In the example of FIG. 3, a base station (e.g., an eNB or a gNB) transmits an RRC connection release message to the UE at time T3. The RRC connection release message may include a PUR configuration or reconfiguration. The PUR configuration or reconfiguration may identify a PUR start time for performing an uplink transmission using the PUR. In some implementations, the base station may configure and/or reconfigure the PUR with or without UE request, such as the UE request transmitted at time T2. In some implementations, the PUR configuration and/or PUR reconfiguration include(s) one or more bits to indicate least significant bits (LSBs) of a current hyper system frame number (H-SFN) to resolve misalignment. In some such implementations, one bit is allocated for indicating the LSB. In other implementations, more than one least significant bits of an H-SFN may be indicated. In some such implementations, remaining bits identifying the H-SFN may be present in a system information block or determined by UE based on the information in a system information block.

In response to receiving the RRC connection release, the UE enters an RRC idle mode at time T4. While in the idle mode, the UE transmits uplink data to the base station on the pre-configured uplink resource (PUR) at the PUR start time, indicated as time T5. The PUR start time may be a specific subframe from a set of subframes in a frame. In some examples, the UE uses the PUR to perform an uplink data transmission to the base station. In the example of FIG. 3, at time T6, the PUR is released after the UE performed the idle mode transmissions (e.g., RRC IDLE mode transmission). In one configuration, the PUR may be released in response to the UE receiving a PUR release message from the base station (not shown in FIG. 3). Alternatively, the UE may autonomously release the PUR without receiving the PUR release message. In some examples, the UE may enter a connected mode (e.g., RRC connected mode) after the PUR is released.

As discussed, the UE may request an offset for the PUR start time. The PUR configuration request transmitted by the UE may include a time offset request. The PUR configuration transmitted by the base station may include a time offset. The maximum PUR time offset range may be the same as the maximum PUR periodicity. Future recurring PUR occasions are based on the first PUR occasion and PUR periodicity. In one configuration, the PUR configuration request may be transmitted in a PURConfigurationRequest message. A requestedTimeOffset field may request the offset. The base station may transmit the PUR start time in a pur-StartTime field of a PUR-Config information element. Additionally, the base station may configure and/or reconfigure the PUR with or without the UE request. The PUR configuration and/or reconfiguration may be provided in an RRC connection release message. That is, a PUR-Config information element may be included in the RRCConnectionRelease message.

The network may be unaware of when the UE successfully receives the RRC connection release message. The release message may be successfully received via potential repetitions of an initial transmission, as well as one or more potential retransmissions. In some examples, the one or more retransmissions may also be repetitions. After the release message is successfully received by the UE, the UE enters an idle mode without sending a confirmation RRC message to the network. The confirmation may be a physical layer ACK (PHY ACK) or RLC poll bit, if configured.

In conventional systems, based on current medium access control (MAC) specifications, it is possible to have a misalignment. For example, the UE may receive a downlink message in a first physical downlink shared channel (PDSCH). In this example, the base station may miss the acknowledgment (ACK) and retransmit the downlink message. The UE may skip decoding the second downlink message, still the UE may send an ACK corresponding to the first downlink message. The base station may wrongly assume the UE only received the second downlink message. Depending on when the downlink message is received by the UE, the understanding of PUR start time (e.g., first PUR occasion) may be misaligned. An unambiguous reference time is desirable to determine the first PUR occasion.

The offset time may be provided in terms of a relative delay and/or gap with respect to a current time. To reduce ambiguity, one or more solutions may be used. In one configuration, one or more least significant bits (LSBs) of a current hyper system frame number (H-SFN) may be included in the PUR configuration message to indicate the reference time of an initial downlink (DL) message transmitted by a base station.

In some implementations, based on receiving the PUR configuration (e.g., pur-Config) or reconfiguration, the UE determines the PUR start time (e.g., first PUR occasion) occurs at an H-SFN determined by H-SFN=(H-SFN$_{Ref}$+offset) mod 1024 occurring after FLOOR (offset/1024) H-SFN cycles, where an offset may be determined by an identifier in the PUR configuration, such a periodicityAndOffset identifier. Additionally, H-SFN$_{Ref}$ corresponds to the H-SFN corresponding to a last subframe of a first transmission of the RRC connection release message (e.g., RRCConnectionRelease) containing the PUR configuration, while taking into account the H-SFN LSB information. In some examples, the H-SFN cycle corresponds to the duration of 1024 H-SFNs. Additionally, a system frame number (SFN) and a subframe for a PUR start time may be indicated by a start SFN indicator (e.g., startSFN) and a start subframe indicator (e.g., startSubframe).

A number of bits for the LSB may be based on a length of time for determining the initial DL message. For example, a one-bit LSB may be used to determine the initial DL message after one or more DL retransmission(s). The same LSB(s) of an H-SFN corresponding to the initial DL message may be included in subsequent retransmissions of the same DL message. Both the network and the UE determine the first PUR occasion based on the reference H-SFN corresponding to the initial DL message. That is, a retransmitted message has the same H-SFN value as in the initial transmission of a message.

Additionally, or alternatively, a value of the LSB may be the LSB of an H-SFN that is subsequent to a current H-SFN (e.g., subsequent to an initial PUR configuration message transmission). In some examples, the value of the LSB may be the LSB of an H-SFN that was previous to a current H-SFN. In some implementations, if one bit LSB is used, the bit may be set to (H-SFN and 0000000001b) if the reference point is the start of the current H-SFN. Alternatively, the bit may be set to ((H-SFN+1) AND 0000000001b) if the reference point is the start of a subsequent H-SFN. In such examples, the H-SFN is 10 bits. The H-SFN is not limited to 10 bits, more bits or fewer bits may be used for the H-SFN.

In one configuration, if the UE transmits a radio link control (RLC) status report, the report may include the LSB(s) of the H-SFN on which the UE received the connection release (e.g., RRC connection release). The base station and UE may use the indicated H-SFN as the reference time.

In one configuration, if the UE decodes a DL transmission, the UE may determine if the DL transmission was a DL retransmission. For example, an indication from a medium access control (MAC) layer to a radio resource control (RRC) layer in the UE may indicate that the base station tried to retransmit the H-SFN. Thus, the UE should use the new H-SFN as the reference H-SFN instead of the previously decoded H-SFN.

For each transmission and retransmission, the MAC protocol data unit (PDU) containing the downlink message may be repeated in multiple subframes (e.g., 1, 2, 4, 8, etc.) for extended coverage. The H-SFN may change for each repetition subframe. In one configuration, a mapping of the reference H-SFN to a specific shared downlink channel (e.g., physical downlink shared channel (PDSCH)) repetition subframe is fixed. For example, the reference H-SFN may be specified as the H-SFN corresponding to a last subframe of a PDSCH repetition. Alternatively, the SFN may be specified as the H-SFN corresponding to a first subframe of a PDSCH repetition. Additionally, or alternatively, in the PUR configuration, the actual subframe within the H-SFN is indicated for the first PUR occasion.

In one configuration, a start time of the first PUR is provided in terms of an absolute H-SFN number instead of relative to the current time. For example, the H-SFN number may be H-SFN number two hundred. If the current H-SFN number is one thousand, the UE will wait until H-SFN two hundred (which occurs after H-SFN wrap around). The start time in terms of an absolute H-SFN number may be included in a PUR configuration transmitted by a base station or a PUR configuration request transmitted by a UE.

In LTE, for example, a length of an H-SFN is 10.24 seconds and an H-SFN is 10 bits. As such, the H-SFNs wrap around every 2.9 hours (e.g., 10.24 seconds*1024=2.9127 hours). The H-SFN may wrap around one or more times before the first PUR occasion with regards to a current time. Therefore, the UE may be notified for a number of H-SFN wraparounds to skip from a current time until a first occurrence of the PUR.

In the PUR configuration, a specific subframe, such as a specific subframe number, within the H-SFN is indicated for the first PUR occasion. That is, the specific subframe (e.g., actual subframe) within the H-SFN may be indicated as the PUR start time.

In one configuration, a start time of the first PUR is provided in terms of an absolute timestamp (e.g., UTC time). The start time in terms of an absolute timestamp may be included in a PUR configuration transmitted by a base station or a PUR configuration request transmitted by a UE.

In some implementations, the specific subframe within the H-SFN may be excluded for the PUR configuration request message. A granularity in terms of H-SFN duration may be sufficient for the request.

For a PUR configuration request transmitted by a UE, an indication for a subframe within the H-SFN for the first PUR occasion may be excluded. A granularity in terms of an H-SFN duration may be sufficient for the request. As discussed, the offset requests a PUR start time in terms of a relative H-SFN gap or relative time gap from a current H-SFN or a current absolute time. The offset may also be relative to fractions of H-SFNs (e.g., subframes).

Figure 4:
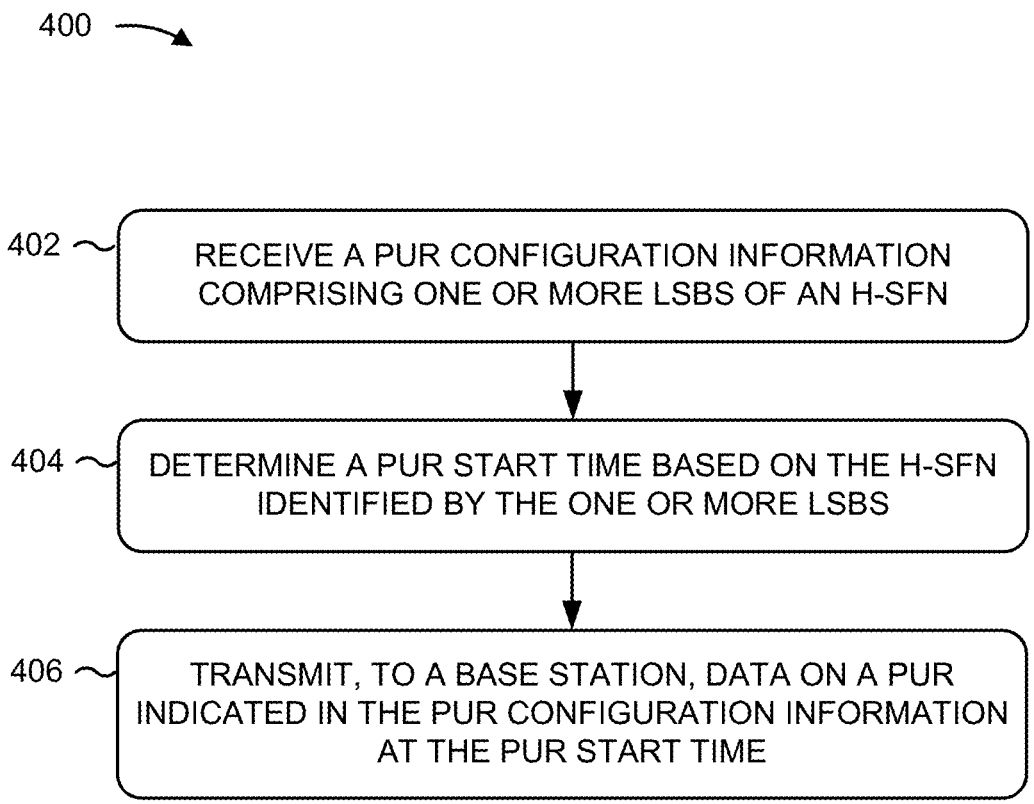
FIGS. 4-6 are diagrams illustrating example processes performed, for example, by a receiving device, in accordance with various aspects of the present disclosure.

FIG. 4 is a diagram illustrating an example process 400 performed, for example, by a UE, in accordance with various aspects of the present disclosure. As shown in FIG. 4, at block 402, a UE (e.g., using the antenna 252, demodulator (DEMOD) 254, RX processor 258, controller/processor 280, memory 282, and/or the like) receives PUR configuration information comprising one or more LSBs of a reference H-SFN. In some implementations, a value of the one or more LSBs corresponds to the LSB(s) of a H-SFN corresponding to a last subframe of the initial DL message transmission. In other implementations, a value of the one or more LSBs corresponds to the LSB(s) of a H-SFN corresponding to a first subframe of the initial DL message transmission. Alternatively, a value of the LSB corresponds to an H-SFN subsequent to an initial DL message transmission. In other implementations, the one or more LSBs indicates a reference time of an initial downlink message. In such implementations, the initial DL message included the PUR configuration information. In some such implementations, the initial downlink message is an RRC connection release message, such as the RRC connection release message received at time T3 in FIG. 3. In such implementations, a retransmission of the initial DL message includes the one or more LSBs.

At block 404, the UE (e.g., using the controller/processor 280, memory 282, and/or the like) determines a PUR start time based on the H-SFN identified by the one or more LSBs. In some implementations, the H-SFN may further be determined based on a specific subframe of a set of subframes for repetitions of a physical downlink shared channel (PDSCH). At block 406, the UE (e.g., using the antenna 252, modulator (MOD) 254, TX processor 264, controller/processor 280, memory 282, and/or the like) transmits, to a base station, data on a PUR indicated in the PUR configuration information at the PUR start time.

Figure 5:
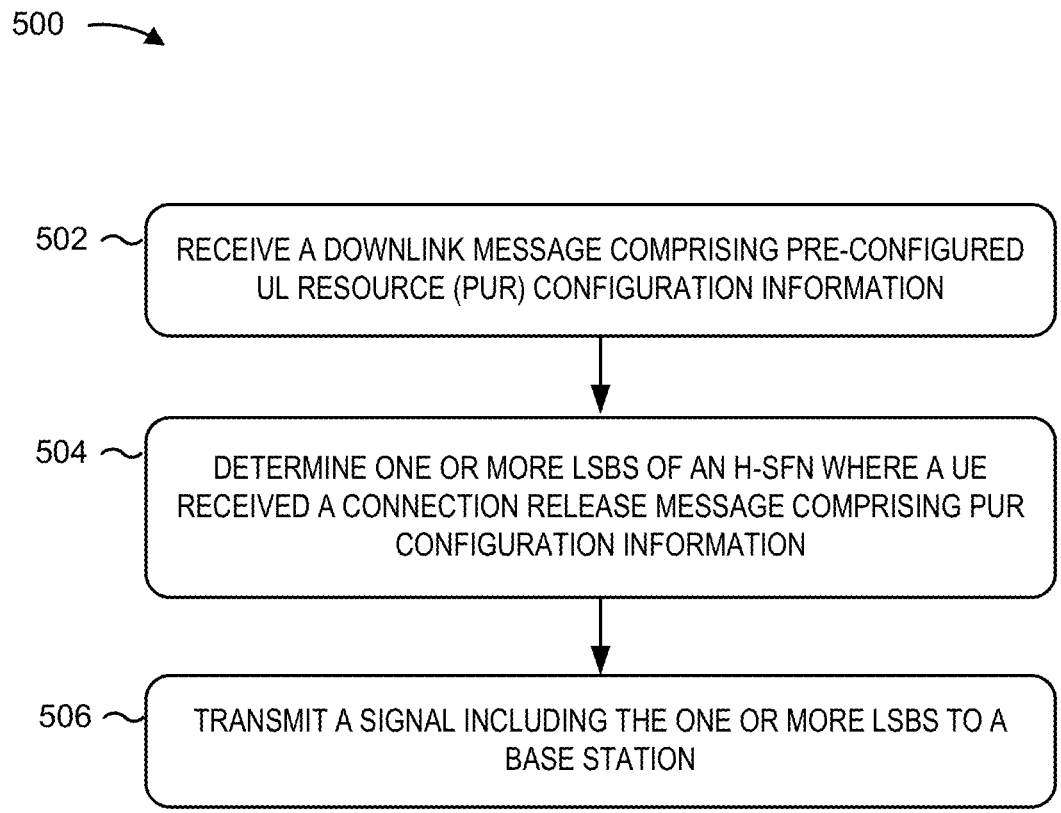

FIG. 5 is a diagram illustrating an example process 500 performed, for example, by a UE, in accordance with various aspects of the present disclosure. As shown in FIG. 5, at block 502, a UE (e.g., using the antenna 252, DEMOD 254, RX processor 258, controller/processor 280, memory 282, and/or the like) receives a downlink message comprising pre-configured uplink (UL) resource (PUR) configuration information. In some examples, the downlink message is a radio resource control (RRC) connection release message.

In the example of FIG. 5, at block 504, the UE (e.g., using the controller/processor 280, memory 282, and/or the like) determines one or more LSBs of an H-SFN where a UE received a connection release message comprising PUR configuration information. In some implementations, the UE determines a PUR start time based on the H-SFN corresponding to the at least one LSB. In some implementations, the UE may determine the H-SFN based on a specific subframe within a set of subframes used for repetitions of a physical downlink shared channel (PDSCH). The specific subframe may be a first subframe of the set of subframes used for repetitions of the PDSCH. In some implementations, the specific subframe may be a last subframe of the set of subframes used for repetitions of the PDSCH. In other implementations, the UE receives a message identifying a subframe of the H-SFN, the identified subframe corresponding to the PUR start time.

At block 506, the UE (e.g., using the antenna 252, MOD 254, TX processor 264, controller/processor 280, memory 282, and/or the like) transmits a signal including the one or more LSBs to a base station. The signal may be included in an RLC message, an RRC message, or another type of signal. The base station may align the PUR start time with the UE based on the one or more LSBs included in the message.

Figure 6:
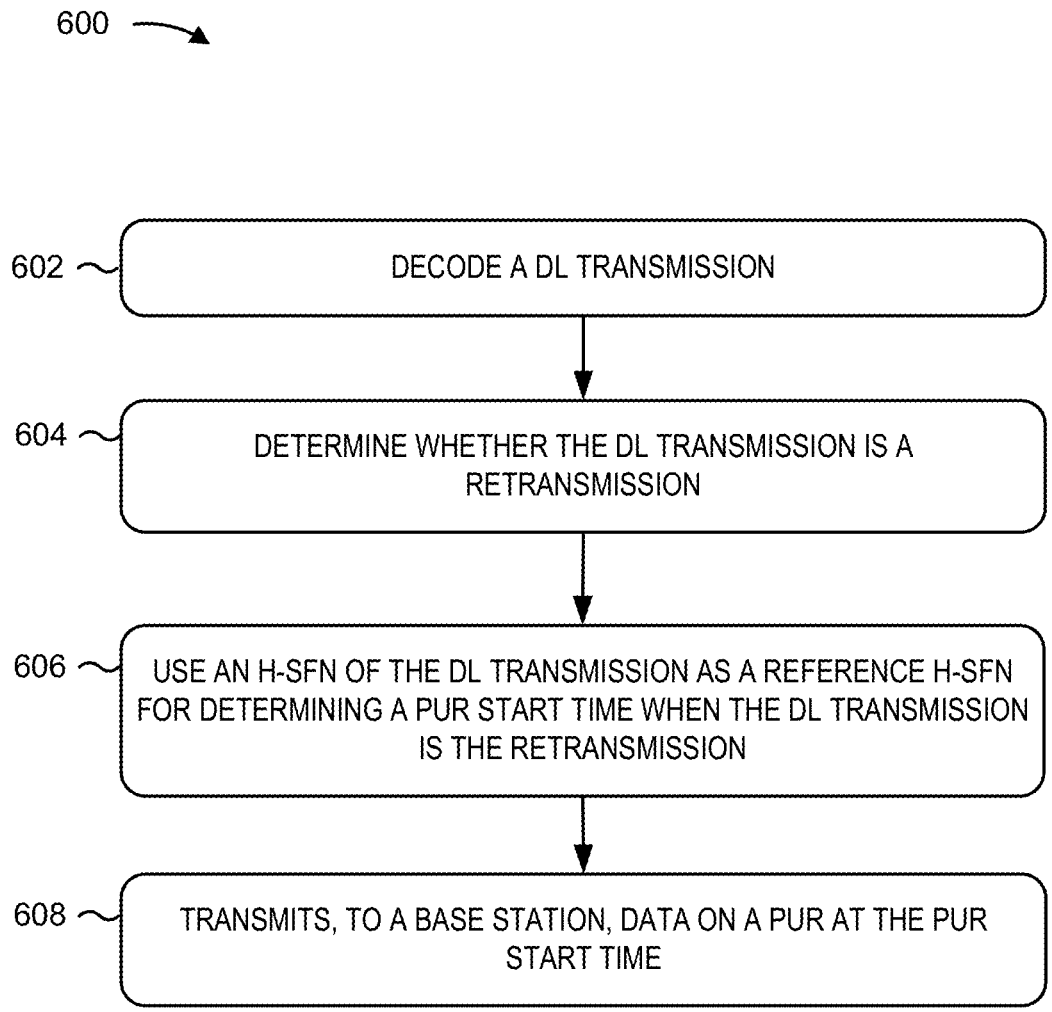

FIG. 6 is a diagram illustrating an example process 600 performed, for example, by a UE, in accordance with various aspects of the present disclosure. As shown in FIG. 6, at block 602, a UE (e.g., using the controller/processor 280, memory 282, and/or the like) decodes a downlink (DL) transmission. At block 604, the UE (e.g., using the controller/processor 280, memory 282, and/or the like) determines whether the DL transmission is a retransmission. In some examples, the UE determines whether the DL transmission is a retransmission based on an RRC message.

At block 606, the UE (e.g., using the controller/processor 280, memory 282, and/or the like) uses an H-SFN of the DL transmission as a reference H-SFN for determining a PUR start time when the DL transmission is the retransmission. In some implementations, the UE determines the H-SFN based on a specific subframe within the subframes used for repetitions of a physical downlink shared channel (PDSCH). In some such implementations, the specific subframe is a first subframe of the subframes used for repetitions of the PDSCH. In other such implementations, the specific subframe is a last subframe of the subframes used for repetitions of the PDSCH. In other implementations, the UE receives, from the base station, PUR configuration information and determines a subframe corresponding to the PUR start time based on the PUR configuration information. In still other implementations, the UE receives a message identifying a subframe of the H-SFN. In such implementations, the identified subframe corresponds to the PUR start time. At block 608, the UE (e.g., using the antenna 252, MOD 254, TX processor 264, controller/processor 280, memory 282, and/or the like) transmits, to a base station, data on a PUR at the PUR start time.

Implementation examples are described in the following numbered clauses:

1. A method for wireless communication, comprising:
   receiving a pre-configured uplink resource (PUR) configuration information comprising at least one least significant bit (LSB) of a hyper system frame number (H-SFN);
   determining a PUR start time based on the H-SFN identified at least by the LSB; and
   transmitting, to a base station, a data message on a PUR indicated in the PUR configuration information at the PUR start time.
2. The method of clause 1, in which a value of the LSB corresponds to an LSB of a current H-SFN or a last H-SFN.
3. The method of any of clauses 1-2, in which:
   the LSB indicates a reference time of an initial downlink message; and
   the initial downlink message comprises the PUR configuration information.

4. The method of clause 3, in which the initial downlink message comprises a radio resource control (RRC) connection release message.
5. The method of clause 3, in which retransmissions of the initial downlink message comprise the LSB.
6. The method of any of clauses 1-5, in which a value of the LSB corresponds to an H-SFN subsequent to an initial downlink message.
7. The method of any of clauses 1-6, further comprising determining the H-SFN based on a specific subframe of a set of subframes for repetitions of a physical downlink shared channel (PDSCH).
8. The method of clause 7, in which the specific subframe is a first subframe of the set of subframes.
9. The method of clause 7, in which the specific subframe is a last subframe of the set of subframes used.
10. The method of any of clauses 1-9, in which the PUR configuration information comprises an initial configuration information or reconfiguration information.
11. A method for wireless communication, comprising:
receiving a downlink message comprising pre-configured uplink resource (PUR) configuration information;
determining at least one least significant bit (LSB) of a hyper system frame number (H-SFN) corresponding to the received downlink message; and
transmitting a signal including the at least one LSB to a base station.
12. The method of clause 11, in which the downlink message comprises a radio resource control (RRC) connection release message.
13. The method of any of clauses 11-12, further comprising determining a PUR start time based on the H-SFN corresponding to the at least one LSB.
14. The method of any of clauses 11-13, further comprising determining the H-SFN based on a specific subframe within a set of subframes used for repetitions of a physical downlink shared channel (PDSCH).
15. The method of clause 14, in which the specific subframe is a first subframe of the set of subframes used for repetitions of the PDSCH.
16. The method of clause 14, in which the specific subframe is a last subframe of the set of subframes used for repetitions of the PDSCH.
17. The method of any of clauses 11-16, further comprising receiving a message identifying a subframe of the H-SFN, the identified subframe corresponding to a PUR start time.
18. A method for wireless communication, comprising:
decoding a downlink transmission;
determining whether the downlink transmission is a retransmission;
determining a pre-configured uplink resource (PUR) start time based on a hyper system frame number (H-SFN) of the downlink transmission as a reference H-SFN when the downlink transmission is the retransmission; and
transmitting, to a base station, data on a PUR at the PUR start time.
19. The method of clause 18, further comprising determining whether the downlink transmission is the retransmission based on a radio resource control (RRC) message.
20. The method of any of clauses 18-19, further comprising determining the H-SFN based on a specific subframe of a set of subframes used for repetitions of a physical downlink shared channel (PDSCH).
21. The method of clause 20, in which the specific subframe is a first subframe of the set of subframes used for repetitions of the PDSCH.
22. The method of clause 20, in which the specific subframe is a last subframe of the set of subframes used for repetitions of the PDSCH.
23. The method of any of clauses 18-22, further comprising:
receiving, from the base station, PUR configuration information; and
determining a subframe corresponding to the PUR start time based on the PUR configuration information.
24. The method of any of clauses 18-23, further comprising receiving a message identifying a subframe of the H-SFN, the identified subframe corresponding to the PUR start time.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

Some aspects are described herein in connection with thresholds. As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method for wireless communication, comprising:
   receiving a pre-configured uplink resource (PUR) configuration information comprising at least one least significant bit (LSB) of a hyper system frame number (H-SFN);
   determining a PUR start time based on the H-SFN identified at least by the LSB; and
   transmitting, to a base station, a data message on a PUR indicated in the PUR configuration information at the PUR start time.

2. The method of claim 1, in which a value of the LSB corresponds to an LSB of a current H-SFN or a previous H-SFN.

3. The method of claim 1, in which:
   the LSB indicates a reference time of an initial downlink message; and
   the initial downlink message comprises the PUR configuration information.

4. The method of claim 3, in which the initial downlink message comprises a radio resource control (RRC) connection release message.

5. The method of claim 3, in which retransmissions of the initial downlink message comprise the LSB.

6. The method of claim 1, in which a value of the LSB corresponds to an H-SFN subsequent to an initial downlink message.

7. The method of claim 1, further comprising determining the H-SFN based on a specific subframe of a set of subframes for repetitions of a physical downlink shared channel (PDSCH).

8. The method of claim 7, in which the specific subframe is a first subframe of the set of subframes.

9. The method of claim 7, in which the specific subframe is a last subframe of the set of subframes used.

10. The method of claim 1, in which the PUR configuration information comprises an initial configuration information or reconfiguration information.

11. A method for wireless communication, comprising:
    receiving a downlink message comprising pre-configured uplink resource (PUR) configuration information;
    determining at least one least significant bit (LSB) of a hyper system frame number (H-SFN) corresponding to the received downlink message; and
    transmitting a signal including the at least one LSB to a base station.

12. The method of claim 11, in which the downlink message comprises a radio resource control (RRC) connection release message.

13. The method of claim 11, further comprising determining a PUR start time based on the H-SFN corresponding to the at least one LSB.

14. The method of claim 11, further comprising determining the H-SFN based on a specific subframe within a set of subframes used for repetitions of a physical downlink shared channel (PDSCH).

15. The method of claim 14, in which the specific subframe is a first subframe of the set of subframes used for repetitions of the PDSCH.

16. The method of claim 14, in which the specific subframe is a last subframe of the set of subframes used for repetitions of the PDSCH.

17. The method of claim 11, further comprising receiving a message identifying a subframe of the H-SFN, the identified subframe corresponding to a PUR start time.

18. A method for wireless communication, comprising:
    decoding a downlink transmission;
    determining whether the downlink transmission is a retransmission;
    determining a pre-configured uplink resource (PUR) start time based on a hyper system frame number (H-SFN) of the downlink transmission as a reference H-SFN when the downlink transmission is the retransmission; and
    transmitting, to a base station, data on a PUR at the PUR start time.

19. The method of claim 18, further comprising determining whether the downlink transmission is the retransmission based on a radio resource control (RRC) message.

20. The method of claim 18, further comprising determining the H-SFN based on a specific subframe of a set of subframes used for repetitions of a physical downlink shared channel (PDSCH).

21. The method of claim 20, in which the specific subframe is a first subframe of the set of subframes used for repetitions of the PDSCH.

22. The method of claim 20, in which the specific subframe is a last subframe of the set of subframes used for repetitions of the PDSCH.

23. The method of claim 18, further comprising:
    receiving, from the base station, PUR configuration information; and
    determining a subframe corresponding to the PUR start time based on the PUR configuration information.

24. The method of claim 18, further comprising receiving a message identifying a subframe of the H-SFN, the identified subframe corresponding to the PUR start time.

25. An apparatus for wireless communications at a user equipment (UE), comprising:
    a processor;
    a memory coupled with the processor; and
    instructions stored in the memory and operable, when executed by the processor, to cause the apparatus:
      to receive a pre-configured uplink resource (PUR) configuration information comprising at least one least significant bit (LSB) of a hyper system frame number (H-SFN);
      to determine a PUR start time based on the H-SFN identified at least by the LSB; and
      to transmit, to a base station, data on a PUR indicated in the PUR configuration information at the PUR start time.

26. The apparatus of claim 25, in which:
    the LSB indicates a reference time of an initial downlink message; and
    the initial downlink message comprises the PUR configuration information.

27. The apparatus of claim 26, in which the initial downlink message comprises a radio resource control (RRC) connection release message.

28. The apparatus of claim 26, in which retransmissions of the initial downlink message comprise the LSB.

29. The apparatus of claim 25, further comprising determining the H-SFN based on a first subframe of a set of subframes used for repetitions of a physical downlink shared channel (PDSCH).

30. The apparatus of claim 25, further comprising determining the H-SFN based on a last subframe of a set of subframes used for repetitions of a physical downlink shared channel (PDSCH).

* * * * *